(12) United States Patent  
Fukao et al.

(10) Patent No.: US 12,054,138 B2  
(45) Date of Patent: Aug. 6, 2024

(54) VEHICLE CONTROL DEVICE

(71) Applicant: HONDA MOTOR CO., LTD., Tokyo (JP)

(72) Inventors: Masashi Fukao, Saitama (JP); Masaya Agata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 276 days.

(21) Appl. No.: 17/682,555

(22) Filed: Feb. 28, 2022

(65) Prior Publication Data

US 2022/0306079 A1 Sep. 29, 2022

(30) Foreign Application Priority Data

Mar. 25, 2021 (JP) ................. 2021-052251

(51) Int. Cl.
*B60W 20/30* (2016.01)
*B60W 20/20* (2016.01)
*B60W 30/18* (2012.01)
*G01C 21/34* (2006.01)

(52) U.S. Cl.
CPC ............ *B60W 20/30* (2013.01); *B60W 20/20* (2013.01); *B60W 30/18109* (2013.01); *G01C 21/3469* (2013.01); *B60W 2510/0657* (2013.01)

(58) Field of Classification Search
CPC ................ B60W 20/30; B60W 20/20; B60W 30/18109; B60W 2510/0657; G01C 21/3469
See application file for complete search history.

(56) References Cited

U.S. PATENT DOCUMENTS

2005/0003925 A1 1/2005 Wakashiro et al.

FOREIGN PATENT DOCUMENTS

JP 2005-027466 A 1/2005

*Primary Examiner* — Michael D Lang
(74) *Attorney, Agent, or Firm* — Paratus Law Group, PLLC

(57) ABSTRACT

A vehicle control device controls a vehicle including an internal combustion engine, an electric motor, and a drive wheel driven by an output of at least one of the internal combustion engine and the electric motor. When the internal combustion engine is in a cylinder deactivation operation, if a target torque reaches a cylinder deactivation bottom torque at which a value of a cylinder deactivation brake specific fuel consumption, which is a brake specific fuel consumption when the internal combustion engine is in the cylinder deactivation operation, is minimized, the vehicle control device executes cylinder deactivation bottom assist control for increasing a motor torque output from the electric motor in accordance with an increase in the target torque while maintaining an engine torque output from the internal combustion engine at the cylinder deactivation bottom torque.

3 Claims, 5 Drawing Sheets

VEHICLE CONTROL DEVICE

CROSS-REFERENCE TO RELATED APPLICATIONS

The present application claims the benefit of priority of Japanese Patent Application No. 2021-052251, filed on Mar. 25, 2021, the content of which is incorporated herein by reference.

TECHNICAL FIELD

The present invention relates to a vehicle control device.

BACKGROUND ART

In the related art, in a vehicle including an internal combustion engine, improvement in the fuel consumption performance is desired. For example, JP-A-2005-27466 discloses a technique for improving the fuel consumption performance in a hybrid vehicle including an internal combustion engine that is switchable between an all-cylinder operation in which all cylinders are operated and a cylinder deactivation operation in which some cylinders are deactivated and operated, and a motor. The internal combustion engine is placed in a cylinder deactivation operation state when a target torque with respect to a crank end torque, which is a torque at a shaft end of a crankshaft of a power plant torque output from a power plant including the internal combustion engine and the motor, is equal to or less than a predetermined cylinder deactivation upper limit torque.

If the opportunity to operate the internal combustion engine at a fuel consumption optimal operating point is increased, the fuel consumption performance will be improved. However, when the internal combustion engine is operated at the fuel consumption optimal operating point and an appropriate crank end torque corresponding to a traveling state of the vehicle cannot be secured, hesitation (so-called slowness of the vehicle) occurs, and the drivability may decrease. From the viewpoint of improving the marketability of the vehicle, it is desired to improve the fuel consumption performance while preventing a decrease in the drivability.

SUMMARY

The present invention provides a vehicle control device capable of improving a fuel consumption performance while preventing a decrease in drivability.

According to an aspect of the present invention, there is provided a vehicle control device for controlling a vehicle including an internal combustion engine, an electric motor, and a drive wheel driven by an output of at least one of the internal combustion engine and the electric motor, where: the internal combustion engine is configured to be switchable between an all-cylinder operation in which all cylinders are operated and a cylinder deactivation operation in which some cylinders are operated in a deactivated state; the vehicle control device is capable of switching an operation state of the internal combustion engine between the all-cylinder operation and the cylinder deactivation operation based on a target torque with respect to a crank end torque, which is a torque at a shaft end of a crankshaft of a power plant torque output from a power plant including the internal combustion engine and the electric motor, and is capable of controlling an output of the internal combustion engine based on a brake specific fuel consumption; and when the internal combustion engine is in the cylinder deactivation operation, if the target torque reaches a cylinder deactivation bottom torque at which a value of a cylinder deactivation brake specific fuel consumption, which is the brake specific fuel consumption when the internal combustion engine is in the cylinder deactivation operation, is minimized, the vehicle control device executes cylinder deactivation bottom assist control for increasing a motor torque output from the electric motor in accordance with an increase in the target torque while maintaining an engine torque output from the internal combustion engine at the cylinder deactivation bottom torque.

According to the present invention, a vehicle control device capable of improving a fuel consumption performance while preventing a decrease in drivability is provided.

DESCRIPTION OF EMBODIMENTS

Hereinafter, an embodiment of a vehicle control device according to the present invention will be described in detail with reference to the drawings.

[Vehicle]

Figure 1:
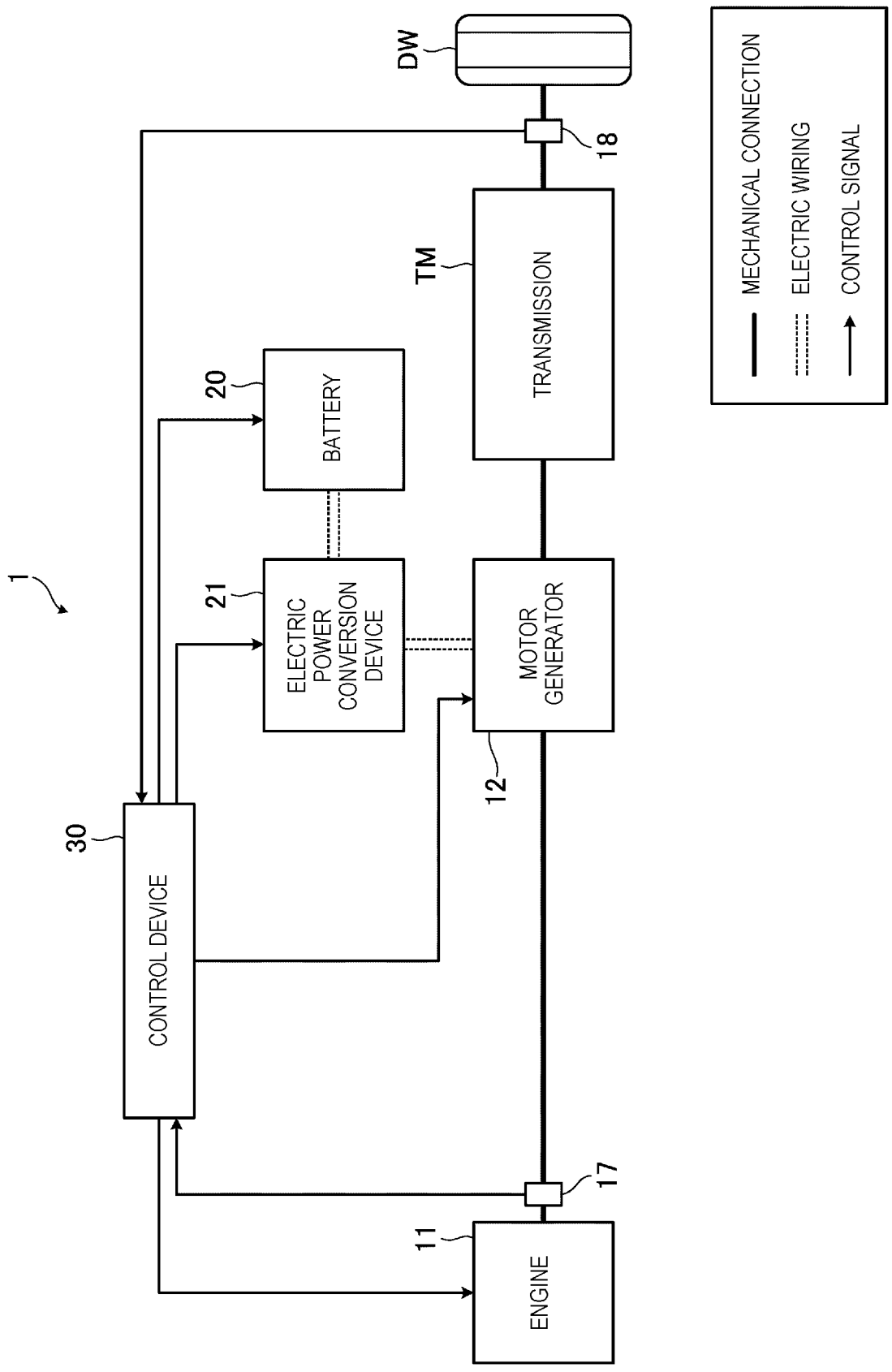
FIG. 1 is a diagram showing an example of a vehicle according to an embodiment.

As shown in FIG. 1, a vehicle 1 of the embodiment is a so-called hybrid electric vehicle, and includes an engine 11 which is an example of an internal combustion engine, a motor generator 12 which is an example of an electric motor, a transmission TM, a drive wheel DW, a battery 20, an electric power conversion device 21, and a control device 30 which is an example of a vehicle control device of the present invention. In FIG. 1, a thick solid line indicates mechanical connection, a double broken line indicates electric wiring, and a solid arrow indicates a control signal.

The engine 11 is, for example, a so-called cylinder deactivation engine configured to be switchable between an all-cylinder operation in which all cylinders are operated and a cylinder deactivation operation in which some cylinders are operated in a deactivated state. For example, the engine 11 is a V-type six-cylinder engine including a variable valve timing mechanism (not shown), and is configured such that three cylinders of one bank can be deactivated by the variable valve timing mechanism. That is, in the engine 11, a six-cylinder operation using six cylinders of both banks is performed during an all-cylinder operation, and a three-cylinder operation using only three cylinders of one bank is performed during a cylinder deactivation operation. In addition, the engine 11 may be configured such that a valve opening period, a valve opening and closing timing, a lift amount, and the like of each intake valve can be changed by the variable valve timing mechanism.

Figure 2:
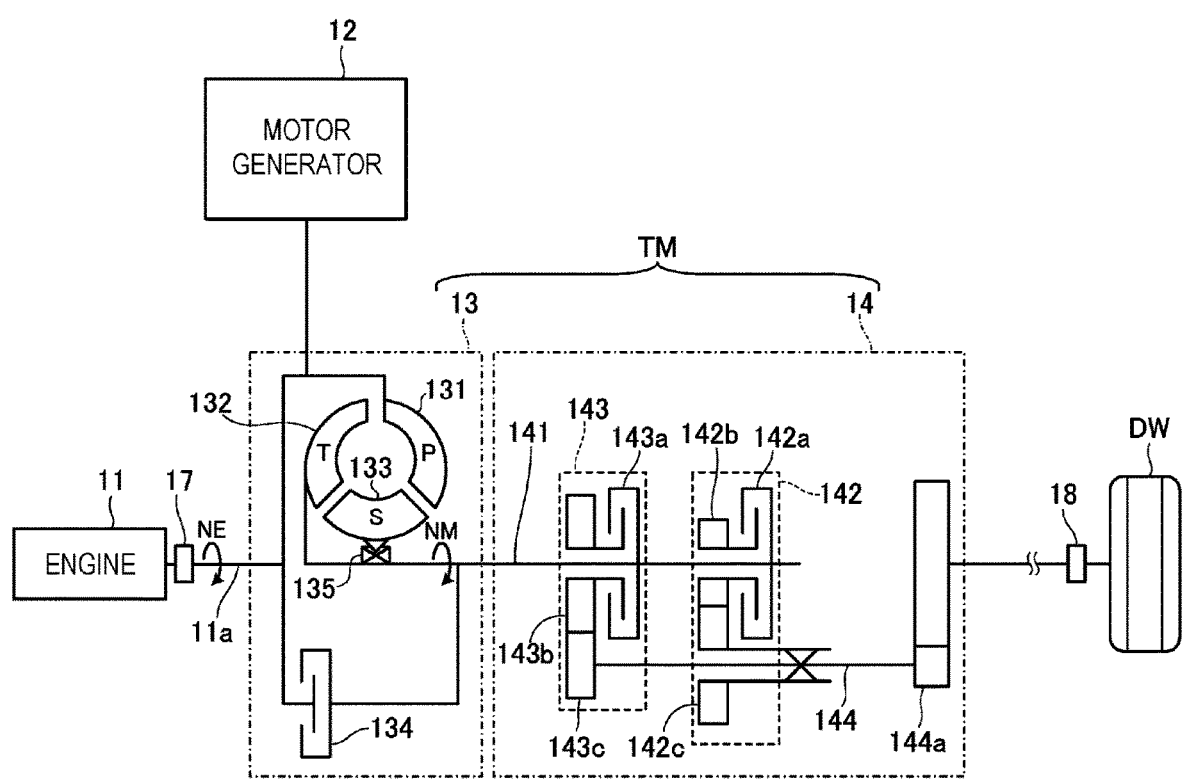
FIG. 2 is a diagram showing an example of a transmission provided in the vehicle according to the embodiment.

The engine 11 outputs mechanical energy (power) generated by burning supplied fuel (for example, gasoline) by rotationally driving a crankshaft 11a (see FIG. 2). Power output from the engine 11 (hereinafter, also simply referred to as the output of the engine 11) is transmitted to the drive wheel DW via the transmission TM that is mechanically connected to the engine 11, and is used for traveling of the vehicle 1.

In addition, the engine 11 is also mechanically connected to the motor generator 12. The motor generator 12 is, for example, a three-phase AC motor, and functions as an electric motor that outputs power by being supplied with electric power. Specifically, a rotor (not shown) of the motor generator 12 is connected to the crankshaft 11a of the engine 11. Therefore, a crank end torque is the sum of a torque output from the engine 11 (hereinafter, also referred to as an engine torque) and a torque output from the motor generator 12 (hereinafter, also referred to as a motor torque). The crank end torque is a torque at a shaft end of the crankshaft 11a of a power plant torque output from a power plant including the engine 11 and the motor generator 12.

Since the engine 11 and the motor generator 12 are mechanically connected to each other, the vehicle 1 can perform motor assist in which driving of the drive wheel DW using the output of the engine 11 (that is, traveling of the vehicle 1) is assisted by power output from the motor generator 12 (hereinafter, also simply referred to as an output of the motor generator 12).

In addition, since the engine 11 and the motor generator 12 are mechanically connected to each other, the motor generator 12 can be rotationally driven by the output of the engine 11, or the engine 11 can be rotationally driven by the output of the motor generator 12. Specifically, the engine 11 can be started by cranking of the motor generator 12 in the vehicle 1.

The motor generator 12 is electrically connected to the battery 20 via the electric power conversion device 21. The battery 20 is, for example, a battery that includes a plurality of electric power storage cells connected in series and can output a predetermined voltage (for example, 50 [V] to 200 [V]). The electric power storage cells of the battery 20 may use a lithium ion battery, a nickel-metal hydride battery, and the like.

The electric power conversion device 21 is a device that includes an inverter (not shown), an AC-DC converter (not shown), and the like. The electric power conversion device 21 is controlled by the control device 30, and performs electric power conversion. For example, the electric power conversion device 21 converts DC electric power supplied from the battery 20 into three-phase AC electric power and supplies the three-phase AC electric power to the motor generator 12, or converts three-phase AC electric power supplied from the motor generator 12 into DC electric power and supplies the DC electric power to the battery 20. The motor generator 12 is supplied with electric power from the battery 20 via the electric power conversion device 21, so that the motor generator 12 can perform the motor assist described above.

In addition, the motor generator 12 also functions as a generator that generates electric power by being rotationally driven. The motor generator 12 can be rotationally driven by the output of the engine 11 as described above, and can also be rotationally driven by power input from the drive wheel DW side accompanying with braking and the like of the vehicle 1. The electric power generated by the motor generator 12 is supplied to the battery 20 via the electric power conversion device 21, and is used to charge the battery 20.

The transmission TM is a multistage transmission having a plurality of gear stages (for example, seven stages), and is provided in a power transmission path from the engine 11 to the drive wheel DW. Specifically, the transmission TM includes a torque converter 13 and a gear box 14 as shown in FIG. 2.

The torque converter 13 includes a pump impeller 131, a turbine runner 132, a stator 133, and a lock-up clutch 134. The pump impeller 131 is mechanically connected to the engine 11 and the motor generator 12 (specifically, the crankshaft 11a), and rotates integrally with the engine 11 and the motor generator 12 when the engine 11 and the motor generator 12 are rotationally driven. The turbine runner 132 has a hydraulic oil inlet located close to a hydraulic oil outlet of the pump impeller 131. The turbine runner 132 is mechanically connected to an input shaft 141 of the gear box 14, and rotates integrally with the input shaft 141. The stator 133 is interposed between the turbine runner 132 and the pump impeller 131, and deflects a flow of hydraulic oil returning from the turbine runner 132 to the pump impeller 131. In addition, the stator 133 is supported by a housing (not shown) and the like of the torque converter 13 via a one-way clutch 135. The torque converter 13 can transmit power (rotational power) from the pump impeller 131 to the turbine runner 132 via the hydraulic oil by circulating the hydraulic oil in a circulation path formed between the pump impeller 131 and the turbine runner 132.

The lock-up clutch 134 is a clutch capable of mechanically connecting and disconnecting the engine 11 to and from the input shaft 141 of the gear box 14. By bringing the lock-up clutch 134 into an engaged state, the output of the engine 11 can be directly transmitted to the input shaft 141 of the gear box 14. That is, when the lock-up clutch 134 is in the engaged state, the crankshaft 11a of the engine 11 and the input shaft 141 of the gear box 14 rotate integrally.

The gear box 14 includes the input shaft 141 to which the output of the engine 11 and the motor generator 12 is transmitted via the torque converter 13, a plurality of transmission mechanisms 142 and 143 capable of shifting power transmitted to the input shaft 141, and an output member 144 including an output gear 144a that outputs the power shifted by any one of the plurality of transmission mechanisms toward the drive wheel DW.

The plurality of transmission mechanisms included in the gear box 14 include the first transmission mechanism 142 and the second transmission mechanism 143. The first transmission mechanism 142 includes a first transmission clutch 142a, a first drive gear 142b that rotates integrally with the input shaft 141 when the first transmission clutch 142a is in an engaged state, and a first driven gear 142c that rotates integrally with the output member 144. The second transmission mechanism 143 includes a second transmission clutch 143a, a second drive gear 143b that rotates integrally with the input shaft 141 when the second transmission clutch 143a is in an engaged state, and a second driven gear 143c that rotates integrally with the output member 144.

Although only the first transmission mechanism 142 and the second transmission mechanism 143 are shown in FIG. 2 as the transmission mechanisms included in the gear box 14, the gear box 14 also includes, for example, a transmission mechanism (not shown) other than the first transmission mechanism 142 and the second transmission mechanism 143.

Whether each clutch included in the transmission TM, namely the lock-up clutch 134, the first transmission clutch 142a, and the second transmission clutch 143a (hereinafter, also simply referred to as the clutch of the transmission TM), is in an engaged state or a released state is controlled by the control device 30.

Returning to FIG. 1, the control device 30 is a device that controls the engine 11, the transmission TM, the electric power conversion device 21, and the like. Further, the control device 30 can also control the motor generator 12 via controlling the electric power conversion device 21. In addition, the control device 30 may directly control the motor generator 12, or may control an input and an output of the battery 20. The control device 30 is implemented by, for example, an electronic control unit (ECU) including a processor that executes various calculations, a storage device that stores various types of information, an input and output device that controls data input and output between an inner side and an outer side of the control device 30, and the like.

Various sensors are connected to the control device 30, and the control device 30 controls the engine 11, the transmission TM, the electric power conversion device 21 (that is, the motor generator 12), and the like based on information input from the various sensors. Examples of the sensors connected to the control device 30 include a rotation speed sensor 17 that detects a rotation speed (hereinafter, also referred to as an engine rotation speed, see NE in FIG. 2) of the engine 11 (the crankshaft 11a), a vehicle speed sensor 18 that detects a traveling speed (hereinafter, also referred to as a vehicle speed) of the vehicle 1, an AP sensor (not shown) that detects an operation amount (hereinafter, referred to as an AP opening degree) with respect to an accelerator pedal, a brake sensor (not shown) that detects an operation amount with respect to a brake pedal, a gear position sensor (not shown) that detects a gear stage of the transmission TM, and a battery sensor (not shown) that detects an output and a temperature of the battery 20. In addition, a main shaft rotation speed sensor that detects a rotation speed (hereinafter, also referred to as a main shaft rotation speed, see NM in FIG. 2) of the input shaft 141, an intake pressure sensor that detects an intake pressure (intake pipe pressure) of the engine 11, an atmospheric pressure sensor that detects an atmospheric pressure, and the like (all of which are not shown) may be connected to the control device 30.

For example, the control device 30 derives a target torque for a crank end torque (hereinafter, also referred to as a crank end required torque) that is the sum of an engine torque and a motor torque, based on a traveling state of the vehicle 1. For example, the control device 30 derives the crank end required torque by referring to the vehicle speed detected by the vehicle speed sensor 18, the AP opening degree detected by the AP sensor, and a map that defines the crank end required torque required for traveling of the vehicle 1 in accordance with the vehicle speed and the AP opening degree. For example, the map is stored in advance in the storage device of the control device 30. Then, the control device 30 controls the engine torque and the motor torque such that the crank end torque becomes the crank end required torque.

In addition, the control device 30 switches an operation state of the engine 11 between the all-cylinder operation and the cylinder deactivation operation based on the crank end required torque. Specifically, the control device 30 controls the engine 11 in the cylinder deactivation operation when the crank end required torque is relatively small, and controls the engine 11 in the all-cylinder operation when the crank end required torque becomes large to some extent. That is, the control device 30 improves fuel consumption performance of the vehicle 1 by operating the engine 11 in the cylinder deactivation operation when the crank end required torque is small, and secures an appropriate crank end torque according to a traveling state of the vehicle 1 by operating the engine 11 in the all-cylinder operation when the crank end required torque is large. A specific example of the switching of the operation state of the engine 11 by the control device 30 will be described later with reference to FIG. 4, FIG. 5, and the like, and thus the description thereof will be omitted here.

[Brake Specific Fuel Consumption (BSFC)]

In addition, the control device 30 controls the engine 11 in consideration of a brake specific fuel consumption (hereinafter, referred to as "BSFC"). The BSFC is obtained by dividing the fuel (fuel injection amount) consumed in one cycle of the engine by the output (net horsepower) of the engine. The smaller the value, the better the fuel efficiency.

The control device 30 controls the engine torque based on the BSFC. Specifically, the control device 30 refers to a BSFC characteristic model representing a BSFC characteristic of the vehicle 1 stored in advance in a storage device and the like of the control device 30, and controls the engine torque such that the BSFC is an optimum value.

[BSFC Characteristic of Vehicle of Embodiment]

Figure 3:
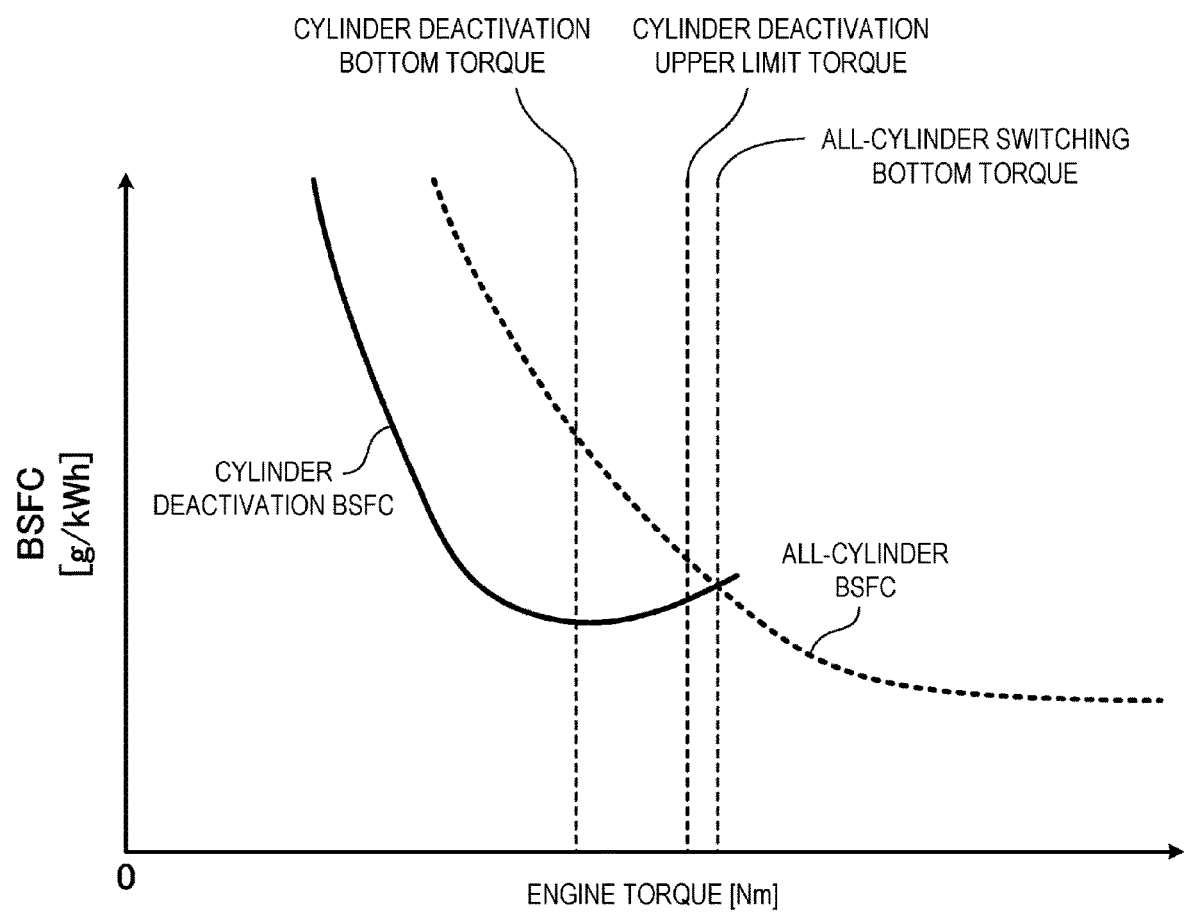
FIG. 3 is a diagram showing an example of a brake specific fuel consumption (BSFC) in the vehicle according to the embodiment.

Here, the BSFC characteristic of the vehicle 1 will be described with reference to FIG. 3. In FIG. 3, the vertical axis represents BSFC [g/kWh], and the horizontal axis represents engine torque [Nm].

As shown in FIG. 3, a cylinder deactivation BSFC, which is the BSFC of the vehicle 1 when the engine 11 is in the cylinder deactivation operation, gradually decreases with an increase in the engine torque until the engine torque reaches a cylinder deactivation bottom torque, and increases with an increase in the engine torque after the engine torque reaches the cylinder deactivation bottom torque. That is, in the case where the engine 11 is in the cylinder deactivation operation, when the engine torque is the cylinder deactivation bottom torque, the value of the BSFC becomes the minimum, and the fuel efficiency becomes the highest. In other words, the cylinder deactivation bottom torque is a fuel consumption optimal operating point of the engine 11 in the cylinder deactivation operation.

In addition, although only a part is illustrated in FIG. 3, an all-cylinder BSFC, which is the BSFC of the vehicle 1 when the engine 11 is in all-cylinder operation, also has a tendency similar to that of the cylinder deactivation BSFC. Specifically, the all-cylinder BSFC gradually decreases with an increase in the engine torque until the engine torque reaches the all-cylinder bottom torque (although not shown, the all-cylinder bottom torque>the cylinder deactivation bottom torque), and increases with an increase in the engine torque after reaching the all-cylinder bottom torque. That is, in the case where the engine 11 is in the all-cylinder operation, when the engine torque is the all-cylinder bottom torque, the value of the BSFC becomes the minimum, and the fuel efficiency becomes the highest.

The cylinder deactivation BSFC shown in FIG. 3 is an example of the cylinder deactivation brake specific fuel consumption, and the all-cylinder BSFC is an example of the all-cylinder brake specific fuel consumption. In addition, since an all-cylinder switching bottom torque and a cylinder deactivation upper limit torque shown in FIG. 3 will be described later, the description thereof will be omitted here.

[Cylinder Deactivation Bottom Assist Control]

When the opportunity to operate the engine 11 is increased such that the engine torque becomes the cylinder deactivation bottom torque (that is, at the fuel consumption optimal operating point) during the cylinder deactivation operation of the engine 11, the fuel consumption performance of the vehicle 1 is improved. On the other hand, when the engine 11 is operated with the cylinder deactivation bottom torque and an appropriate crank end torque according to the traveling state of the vehicle 1 cannot be secured, hesitation (so-called slowness of the vehicle 1) occurs, and the drivability may decrease.

Therefore, the control device 30 executes the cylinder deactivation bottom assist control described below in order to increase the opportunity to operate the engine 11 with the cylinder deactivation bottom torque while securing the appropriate crank end torque according to the traveling state of the vehicle 1.

Figure 4:
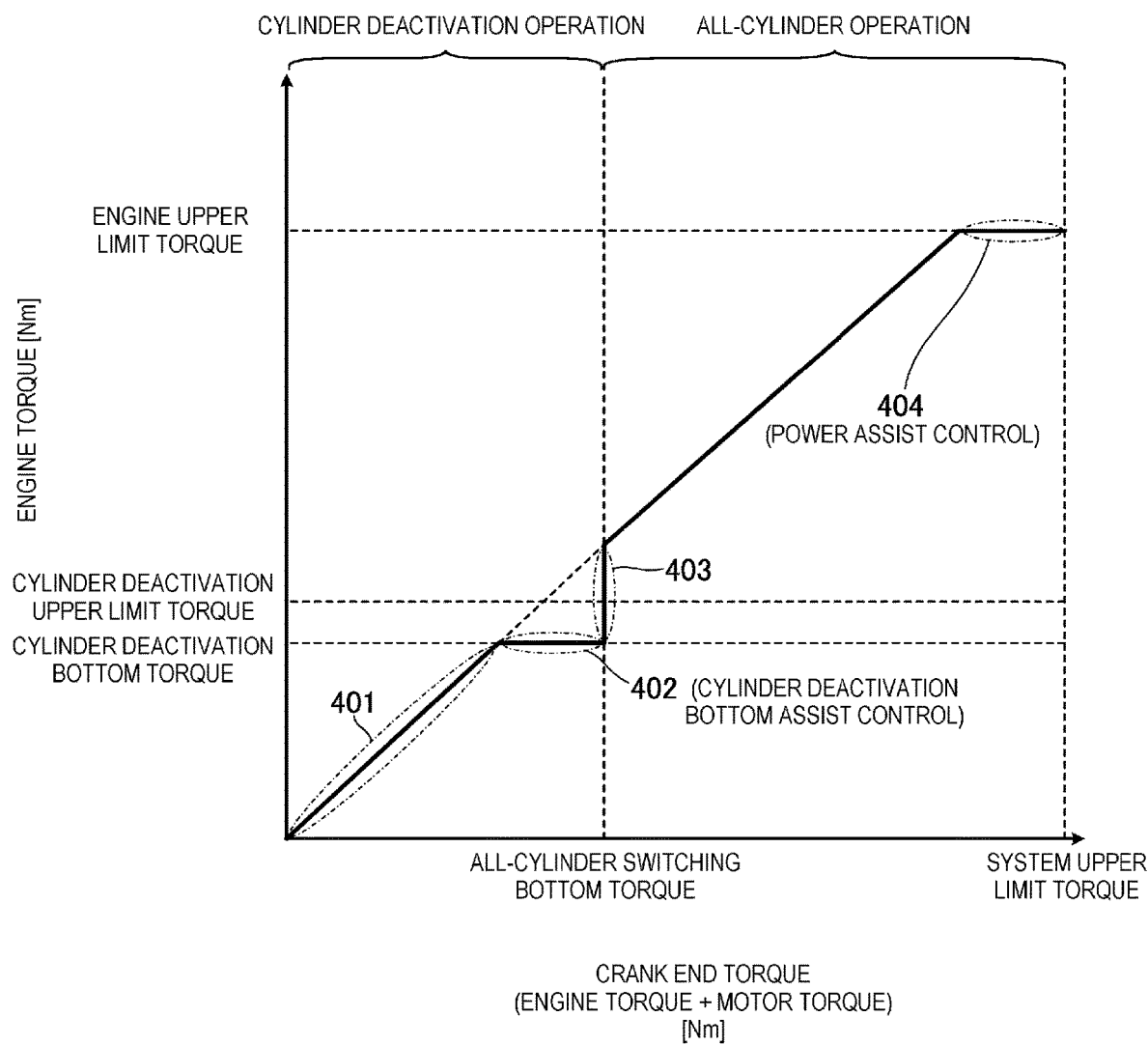
FIG. 4 is a diagram showing an example of cylinder deactivation bottom assist control executed by a control device of the vehicle according to the embodiment.

In FIG. 4, the vertical axis represents the engine torque [Nm], and the horizontal axis represents the crank end torque (that is, the sum of the engine torque and the motor torque) [Nm].

As shown in FIG. 4, in a period until the engine torque reaches the cylinder deactivation bottom torque when the engine 11 is in the cylinder deactivation operation (that is, in a period in which the engine torque<the cylinder deactivation bottom torque), the control device 30 controls the engine 11 so as to secure the crank end required torque only by the engine torque. That is, during this period, the control device 30 increases the engine torque in accordance with the increase in the crank end required torque (see the one-dot chain line denoted by reference numeral 401 in FIG. 4). Accordingly, it is possible to obtain an optimum engine torque from the viewpoint of the BSFC while securing the appropriate crank end torque according to the traveling state of the vehicle 1, and it is possible to improve the fuel consumption performance of the vehicle 1.

Thereafter, when the crank end required torque reaches the cylinder deactivation bottom torque, the control device 30 executes the cylinder deactivation bottom assist control. In the cylinder deactivation bottom assist control, the control device 30 increases the motor torque in accordance with the increase in the crank end required torque while maintaining the engine torque at the cylinder deactivation bottom torque (see the one-dot chain line denoted by reference numeral 402 in FIG. 4). Accordingly, it is possible to secure the appropriate crank end torque according to the traveling state of the vehicle 1 while operating the engine 11 at the fuel consumption optimal operating point. Therefore, it is possible to improve the fuel consumption performance of the vehicle 1 while avoiding deterioration of the drivability due to the occurrence of the hesitation.

Thereafter, when the cylinder deactivation bottom assist control is being executed, if the crank end required torque reaches the all-cylinder switching bottom torque, the control device 30 ends the cylinder deactivation bottom assist control and switches the operation state of the engine 11 to the all-cylinder operation. Here, as shown in FIG. 3, the all-cylinder switching bottom torque is a torque corresponding to an intersection of a curve representing the cylinder deactivation BSFC and a curve representing the all-cylinder BSFC. Accordingly, the operation state of the engine 11 can be switched from the cylinder deactivation operation to the all-cylinder operation at an appropriate timing from the viewpoint of the BSFC.

In addition, when the operation state of the engine 11 is switched to the all-cylinder operation, the control device 30 increases the engine torque and decreases the motor torque in accordance with the increase in the engine torque in order to secure the crank end required torque only by the engine torque (see the one-dot chain line denoted by reference numeral 403 in FIG. 4). Accordingly, in the traveling state of the vehicle 1 at that time, the engine torque can be set to the optimum engine torque from the viewpoint of the BSFC, and it is possible to prevent the occurrence of a sudden change in the crank end torque that may lead to a decrease in drivability at the time of switching to the all-cylinder operation.

Depending on the performance and the like of the motor generator 12, before the crank end required torque reaches the all-cylinder switching bottom torque, the motor torque may reach an upper limit torque (hereinafter, also referred to as a motor upper limit torque) that can be output by the motor generator 12. If the engine torque is maintained at the cylinder deactivation bottom torque even after the motor torque reaches the motor upper limit torque (that is, after the motor torque cannot be increased), there is a possibility that the appropriate crank end torque according to the traveling state of the vehicle 1 cannot be secured.

Therefore, when the cylinder deactivation bottom assist control is being executed, if the motor torque reaches the motor upper limit torque, the control device 30 may end the cylinder deactivation bottom assist control and switch the operation state of the engine 11 to the all-cylinder operation. Accordingly, it is possible to secure the appropriate crank end torque according to the traveling state of the vehicle 1, and it is possible to avoid deterioration in the drivability due to the occurrence of hesitation.

Further, after switching to the all-cylinder operation, when the engine torque increased with the increase in the crank end required torque reaches the upper limit torque that can be output by the engine 11 (hereinafter, also referred to as a "engine upper limit torque"), the control device 30 may execute power assist control for increasing the motor torque in accordance with the increase in the crank end required torque while maintaining the engine torque at the engine upper limit torque (see the one-dot chain line denoted by reference numeral 404 in FIG. 4). Accordingly, it is possible to secure the appropriate crank end torque according to the traveling state of the vehicle 1 while appropriately operating the engine 11 with a torque equal to or less than the engine upper limit torque.

Then, when the power assist control is being executed, if the motor torque increased with the increase in the crank end required torque reaches the motor upper limit torque (that is, if the crank end torque reaches a system upper limit torque which is the sum of the engine upper limit torque and the motor upper limit torque), the control device 30 may stop the increase in the engine torque and the motor torque and maintain the crank end torque at the system upper limit torque. Accordingly, the engine 11 can be appropriately operated with a torque equal to or less than the engine upper limit torque, and the motor generator 12 can be appropriately operated with a torque equal to or less than the motor upper limit torque.

As described above, the control device 30 controls the vehicle 1 including the engine 11, the motor generator 12, and the drive wheel DW driven by the output of at least one of the engine 11 and the motor generator 12. When the engine 11 is in the cylinder deactivation operation, if the crank end required torque reaches the cylinder deactivation bottom torque, the control device 30 executes the cylinder deactivation bottom assist control of increasing the motor torque output from the motor generator 12 in accordance with the increase in the crank end required torque while maintaining the engine torque output from the engine 11 at the cylinder deactivation bottom torque. Accordingly, it is possible to increase the opportunity to operate the engine 11 with the cylinder deactivation bottom torque while securing the appropriate crank end torque according to the traveling state of the vehicle 1. Therefore, it is possible to improve the fuel consumption performance of the vehicle 1 while preventing a decrease in drivability.

On the other hand, if the motor assist is not performed during the cylinder deactivation operation of the engine 11, it is necessary to secure the crank end required torque only by the engine torque. Therefore, when the crank end required torque is larger than the cylinder deactivation bottom torque, it is necessary to increase the engine torque in accordance with the crank end required torque, and the opportunity to operate the engine 11 with the cylinder deactivation bottom torque, which is the fuel consumption optimal operating point, is reduced. In addition, in this way, in order to secure the crank end torque corresponding to the traveling state of the vehicle 1, it is necessary to switch the operation state of the engine 11 to the all-cylinder operation at the time when the engine torque reaches the upper limit torque (hereinafter, also referred to as the "cylinder deactivation upper limit torque") that can be output in the cylinder deactivation operation state of the engine 11. As shown in FIG. 3, in general, the cylinder deactivation upper limit torque is smaller than the all-cylinder switching bottom torque. Therefore, in this way, the opportunity for the engine 11 to be able to perform the cylinder deactivation operation is also reduced. As described above, in this case, the fuel consumption performance is lower than that of the vehicle 1 of the embodiment.

Figure 5:
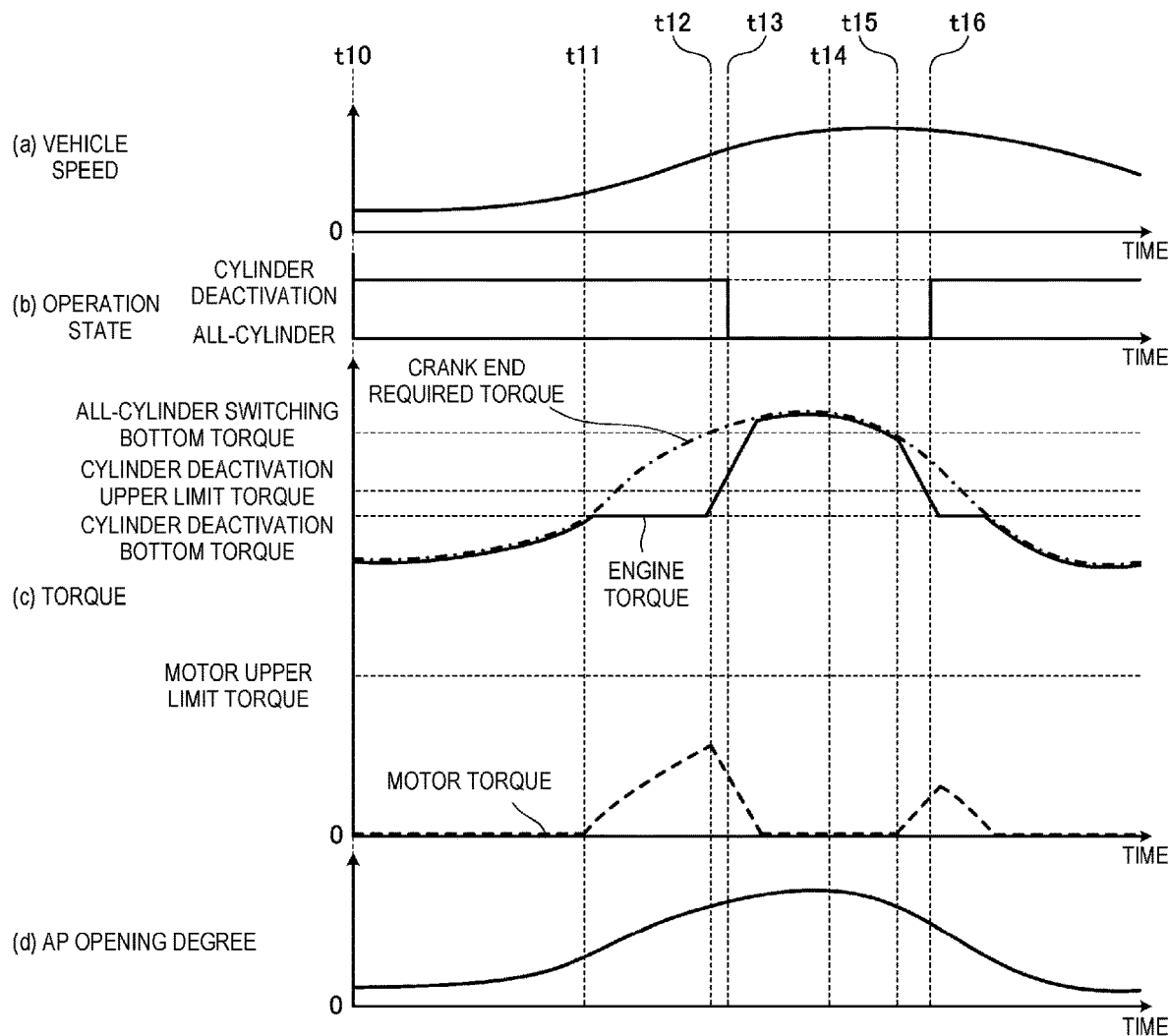
FIG. 5 is a diagram showing another example of the cylinder deactivation bottom assist control executed by the control device of the vehicle according to the embodiment.

Next, another example of the cylinder deactivation bottom assist control will be described with reference to FIG. 5. FIG. 5 shows a temporal relationship among (a) the vehicle speed, (b) the operation state of the engine 11, (c) various torques, and (d) the AP opening degree.

In FIG. 5, an accelerator pedal is gradually depressed by a driver from a time t10 when the vehicle 1 is traveling in a state where the engine 11 is in the cylinder deactivation operation, and accordingly, the AP opening degree, the vehicle speed, and the crank end required torque gradually increase. Since the crank end required torque is smaller than the cylinder deactivation bottom torque at a time before a time t11, the control device 30 controls the engine 11 to secure the crank end required torque only by the engine torque.

Then, from the time t11 when the increased crank end required torque reaches the cylinder deactivation bottom torque, the control device 30 starts the cylinder deactivation bottom assist control, and increases the motor torque in accordance with the increase in the crank end required torque while maintaining the engine torque at the cylinder deactivation bottom torque.

Thereafter, when the crank end required torque further increases and the crank end required torque reaches the all-cylinder switching bottom torque at a time 112, the control device 30 ends the cylinder deactivation bottom assist control and increases the engine torque to secure the crank end required torque only by the engine torque. In addition, the control device 30 decreases the motor torque in accordance with the increase in the engine torque. Then, at a time t13 immediately after the time t12, the control device 30 switches the operation state of the engine 11 to the all-cylinder operation.

In addition, from a time t14 after the time t13, the driver weakens the depression of the accelerator pedal, and accordingly, the AP opening degree, the vehicle speed, and the crank end required torque gradually decrease from the time t14.

Then, the control device 30 starts the cylinder deactivation bottom assist control again from a time t15 when the decreased crank end required torque reaches the cylinder deactivation bottom torque. In the cylinder deactivation bottom assist control in this case, the control device 30 decreases the engine torque in order to achieve the cylinder deactivation bottom torque, and maintains the engine torque as it is when the engine torque reaches the cylinder deactivation bottom torque. In addition, in the cylinder deactivation bottom assist control in this case, the control device 30 increases the motor torque in accordance with the decrease in the engine torque. Accordingly, when the operation state of the engine 11 is switched from the all-cylinder operation to the cylinder deactivation operation, it is possible to prevent the occurrence of a sudden change in the crank end torque that may lead to a decrease in drivability. Then, at a time t16 immediately after the time t15, the control device 30 switches the operation state of the engine 11 to the cylinder deactivation operation.

As described above, according to the control device 30 of the embodiment, it is possible to increase the opportunity to operate the engine 11 with the cylinder deactivation bottom torque while securing the appropriate crank end torque according to the traveling state of the vehicle 1, and it is possible to improve the fuel consumption performance of the vehicle 1 while preventing a decrease in drivability.

Although the embodiment of the present invention has been described above, the present invention is not limited to the above-described embodiment, and modifications, improvements, and the like can be made as appropriate.

For example, in the above-described embodiment, an example in which the engine 11 and the motor generator 12 are connected to each other via the crankshaft 11a has been described, but the present invention is not limited thereto. For example, the motor generator 12 may be connected to a drive shaft that rotates integrally with the drive wheel DW.

In addition, at least the following matters are described in the present specification. Although corresponding constituent elements and the like in the above embodiment are shown in parentheses, the present invention is not limited thereto.

(1) A vehicle control device (the control device 30) for controlling a vehicle (the vehicle 1) including an internal combustion engine (the engine 11), an electric motor (the motor generator 12), and a drive wheel (the drive wheel DW) driven by an output of at least one of the internal combustion engine and the electric motor, in which the internal combustion engine is configured to be switchable between an all-cylinder operation in which all cylinders are operated and a cylinder deactivation operation in which some cylinders are operated in a deactivated state, the vehicle control device is capable of switching an operation state of the internal combustion engine between the all-cylinder operation and the cylinder deactivation operation based on a target torque with respect to a crank end torque, which is a torque at a shaft end of a crankshaft of a power plant torque output from a power plant including the internal combustion engine and the electric motor, and is capable of controlling an output of the internal combustion engine based on a brake specific fuel consumption, and when the internal combustion engine is in the cylinder deactivation operation, if the target torque reaches a cylinder deactivation bottom torque at which a value of a cylinder deactivation brake specific fuel consumption, which is the brake specific fuel consumption when the internal combustion engine is in the cylinder deactivation operation, is minimized, the vehicle control device executes cylinder deactivation bottom assist control for increasing a motor torque output from the electric motor in accordance with an increase in the target torque while maintaining an engine torque output from the internal combustion engine at the cylinder deactivation bottom torque.

According to (1), it is possible to increase the opportunity to operate the internal combustion engine with the cylinder deactivation bottom torque while securing an appropriate crank end torque according to a traveling state of the vehicle, and it is possible to improve the fuel consumption performance of the vehicle while preventing a decrease in drivability.

(2) The vehicle control device according to (1), in which
when the cylinder deactivation bottom assist control is being executed, if the target torque reaches an all-cylinder switching bottom torque larger than the cylinder deactivation bottom torque, the vehicle control device ends the cylinder deactivation bottom assist control and switches the operation state of the internal combustion engine to the all-cylinder operation, and
the all-cylinder switching bottom torque is a torque corresponding to an intersection of a curve representing the cylinder deactivation brake specific fuel consumption and a curve representing an all-cylinder brake specific fuel consumption, which is the brake specific fuel consumption when the internal combustion engine is in the all-cylinder operation.

According to (2), the operation state of the internal combustion engine can be switched from the cylinder deactivation operation to the all-cylinder operation at an appropriate timing from the viewpoint of the brake specific fuel consumption.

(3) The vehicle control device according to (1), in which
when the cylinder deactivation bottom assist control is being executed, if the motor torque reaches an upper limit torque that is capable of being output by the electric motor, the vehicle control device ends the cylinder deactivation bottom assist control and switches the operation state of the internal combustion engine to the all-cylinder operation.

According to (3), it is possible to secure the appropriate crank end torque according to the traveling state of the vehicle, and it is possible to avoid deterioration in the drivability due to the occurrence of hesitation.

The invention claimed is:

1. A vehicle control device for controlling a vehicle including an internal combustion engine, an electric motor, and a drive wheel driven by an output of at least one of the internal combustion engine and the electric motor, wherein:

the internal combustion engine is configured to be switchable between an all-cylinder operation in which all cylinders are operated and a cylinder deactivation operation in which some cylinders are operated in a deactivated state;
the vehicle control device is capable of switching an operation state of the internal combustion engine between the all-cylinder operation and the cylinder deactivation operation based on a target torque with respect to a crank end torque, which is a torque at a shaft end of a crankshaft of a power plant torque output from a power plant including the internal combustion engine and the electric motor, and is capable of controlling an output of the internal combustion engine based on a brake specific fuel consumption; and
when the internal combustion engine is in the cylinder deactivation operation, if the target torque reaches a cylinder deactivation bottom torque at which a value of a cylinder deactivation brake specific fuel consumption, which is the brake specific fuel consumption when the internal combustion engine is in the cylinder deactivation operation, is minimized, the vehicle control device executes cylinder deactivation bottom assist control for increasing a motor torque output from the electric motor in accordance with an increase in the target torque while maintaining an engine torque output from the internal combustion engine at the cylinder deactivation bottom torque.

2. The vehicle control device according to claim 1, wherein:
when the cylinder deactivation bottom assist control is being executed, if the target torque reaches an all-cylinder switching bottom torque larger than the cylinder deactivation bottom torque, the vehicle control device ends the cylinder deactivation bottom assist control and switches the operation state of the internal combustion engine to the all-cylinder operation; and
the all-cylinder switching bottom torque is a torque corresponding to an intersection of a curve representing the cylinder deactivation brake specific fuel consumption and a curve representing an all-cylinder brake specific fuel consumption, which is the brake specific fuel consumption when the internal combustion engine is in the all-cylinder operation.

3. The vehicle control device according to claim 1, wherein
when the cylinder deactivation bottom assist control is executed, if the motor torque reaches an upper limit torque that is capable of being output by the electric motor, the vehicle control device ends the cylinder deactivation bottom assist control and switches the operation state of the internal combustion engine to the all-cylinder operation.

* * * * *